United States Patent
Heatherington et al.

(12) 
(10) Patent No.: US 6,179,353 B1
(45) Date of Patent: Jan. 30, 2001

(54) HIGH FLEX BUMPER WITH REINFORCED CORNER END SECTIONS

(75) Inventors: David W. Heatherington, Spring Lake; James Lupone, Fruitport, both of MI (US)

(73) Assignee: Shape Corporation, Grand Haven, MI (US)

( * ) Notice: Under 35 U.S.C. 154(b), the term of this patent shall be extended for 0 days.

(21) Appl. No.: 09/362,172

(22) Filed: Jul. 27, 1999

(51) Int. Cl.⁷ .................................................. B60R 19/03
(52) U.S. Cl. ......................... 293/122; 293/120; 293/155; 293/154
(58) Field of Search ..................... 293/120, 122, 293/155, 154

(56) References Cited

U.S. PATENT DOCUMENTS

| | | |
|---|---|---|
| 1,300,433 | 4/1919 | McGregor . |
| 3,877,741 | 4/1975 | Wilfert et al. . |
| 3,901,543 * | 8/1975 | Norlin ................................. 293/122 |
| 4,142,753 * | 3/1979 | Klie et al. ......................... 293/120 X |
| 4,328,986 | 5/1982 | Weller et al. . |
| 4,422,680 | 12/1983 | Goupy . |
| 4,563,028 | 1/1986 | Ogawa et al. . |
| 4,569,865 | 2/1986 | Placek . |
| 4,586,738 | 5/1986 | Butler et al. . |
| 4,626,011 | 12/1986 | Gauthier . |
| 4,762,352 | 8/1988 | Enomoto . |
| 4,783,104 | 11/1988 | Watanabe et al. . |
| 4,838,593 | 6/1989 | Fleming et al. . |
| 4,941,701 | 7/1990 | Loren . |
| 4,961,603 | 10/1990 | Carpenter . |
| 5,005,887 * | 4/1991 | Kelman ................................. 293/120 |
| 5,092,512 | 3/1992 | Sturrus et al. . |
| 5,104,026 | 4/1992 | Sturrus et al. . |
| 5,219,197 * | 6/1993 | Rich et al. ............................ 293/120 |
| 5,425,561 | 6/1995 | Morgan . |
| 5,545,022 | 8/1996 | Rosasco . |
| 5,545,361 | 8/1996 | Rosasco . |
| 5,566,874 | 10/1996 | Sturrus . |
| 5,584,518 | 12/1996 | Frank et al. . |
| 5,603,541 | 2/1997 | Wada et al. . |
| 5,727,827 * | 3/1998 | Shibuya et al. ...................... 293/155 |
| 5,803,517 * | 9/1998 | Shibuya ............................... 293/120 |
| 5,997,057 | 12/1999 | Gasko et al. . |
| 6,042,163 * | 3/2000 | Reiffer ............................. 293/154 X |

* cited by examiner

Primary Examiner—D. Glenn Dayoan
Assistant Examiner—Jason Morrow
(74) Attorney, Agent, or Firm—Price Heneveld Cooper Dewitt & Litton

(57) ABSTRACT

A bumper beam construction including an elongated tubular beam of high strength but characteristically flexible to absorb substantial energy on impact having a mounting bracket attached at each end of the center section and at least one stiffening bracket attached to each mounting bracket. The mounting brackets extend from the rear wall of the tubular beam and facilitate attachment to a vehicle frame. The stiffening brackets are attached to the mounting brackets and the end sections of the tubular beam outboard of the center section. The stiffening brackets improve the corner impact strength of the tubular beam without adversely affecting the flexibility of the center section. This corner construction arrangement provides for optimal distribution of stress during corner impacts.

19 Claims, 3 Drawing Sheets

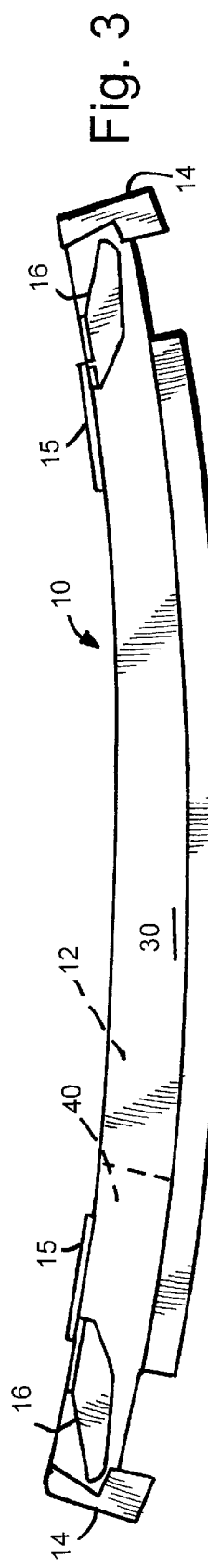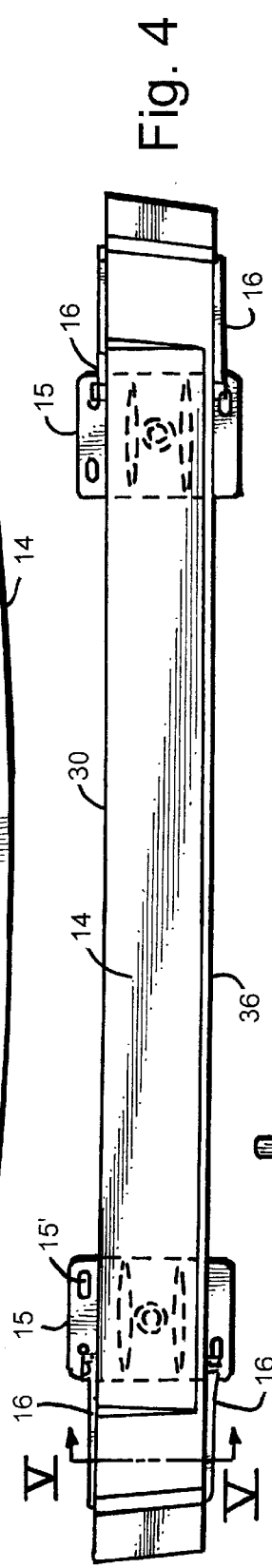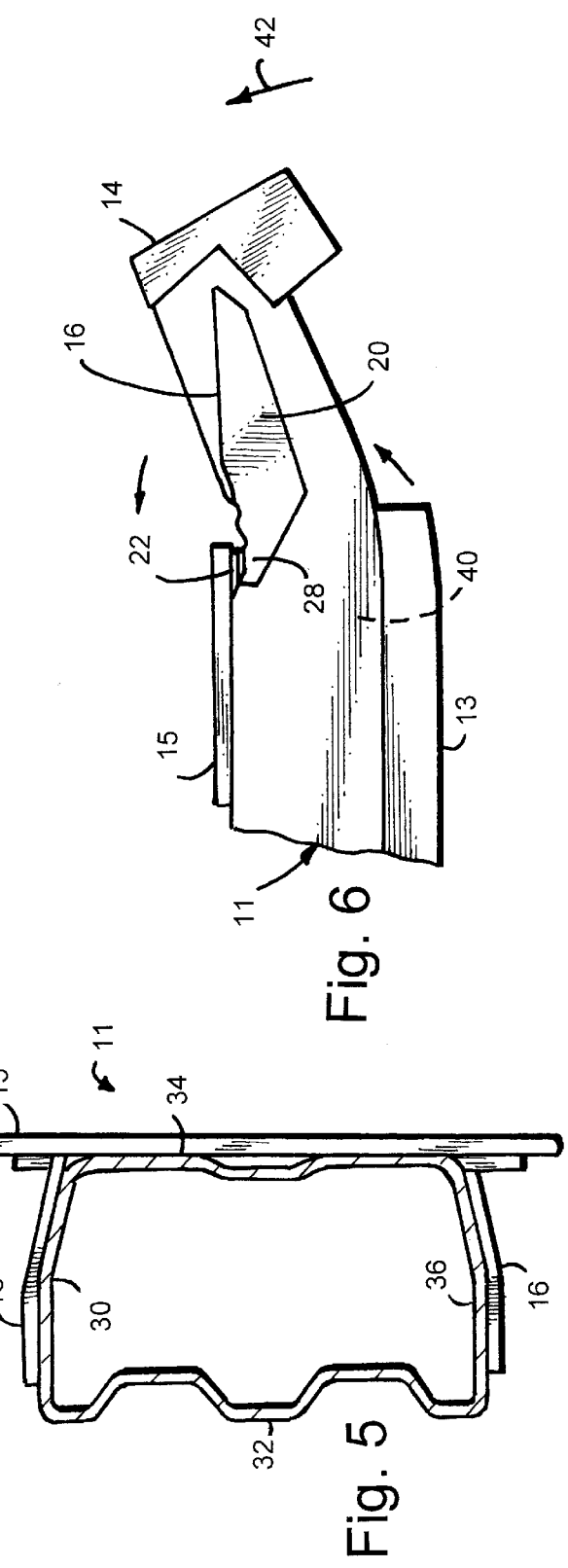

HIGH FLEX BUMPER WITH REINFORCED CORNER END SECTIONS

BACKGROUND OF THE INVENTION

The present invention relates to a bumper construction designed for high impact strength, but further designed for flexibility to provide for optimal energy absorption over a given stroke upon a high force bumper impact, such as a vehicle crash.

Regulations and industry standards for modern vehicle bumpers require that bumpers withstand significant impacts without damage to the bumper. Therefore, bumpers must be strong. However, the bumpers must also be flexible enough to absorb energy during a crash over their full stroke while avoiding unexpected collapse. Further, the bumper must also be lightweight to minimize vehicle mass to provide improved gas mileage and to help meet emission standards. There is tension between these requirements. Bumper beams that are sufficiently flexible to bend in their middle/center sections, may be "too" flexible on their ends (i.e., outside of the mounting brackets) to withstand the high forces generated in corner impacts. Alternatively, bumper beams manufactured to be stiff enough for optimal corner impact (such as those with thicker wall materials or higher stiffness materials) have center sections that may be "too" stiff to properly flex and absorb energy over their full stroke. Also, these "stiffer" bumpers may tend to kink, which results in unexpected collapse and low energy absorption. Further, "stiffer" bumpers tend to be heavier, leading to a greater vehicle mass, lower miles per gallon values, and higher emissions.

Accordingly, a bumper construction is desired solving the aforementioned problems and having the aforementioned advantages.

SUMMARY OF THE INVENTION

In one aspect of the present invention, a bumper construction for vehicles includes an elongated tubular beam having front, rear, top, and bottom walls, and having a center section and end sections. The beam is high strength but characteristically flexible to absorb substantial energy on impact. A mounting bracket is attached at each end of the center section, with the mounting brackets extending from the rear wall and being configured for attachment to a vehicle frame. At least one stiffening bracket is attached to each of the mounting brackets and to the end sections outboard of the center section. The stiffening brackets are attached to one of the top and bottom walls and are constructed to rigidify the end sections for corner impact.

In another aspect of the present invention, a bumper construction for vehicles includes an elongated tubular beam having front, rear, top, and bottom walls that define a cavity, and having a center section and end sections. The beam is high strength but characteristically flexible to absorb substantial energy on impact. Mounting brackets are attached at ends of the center section, with the mounting brackets extending from the rear wall and being configured for attachment to a vehicle frame. An energy absorbing system is attached to the flexible tubular beam, and includes a center absorber filling a significant portion of the cavity in the center section of the beam to stiffen the center section against buckling collapse, and end absorbers on ends of the beam filling the cavity in a significant portion of the opposing end sections to stiffen the end sections against buckling collapse. An inner surface of the end absorbers is spaced from an associated outer end surface of the center absorber to leave an empty end area in the cavity at the mounting brackets to promote flexibility in an area proximate to the mounting brackets to assist in optimizing energy absorption upon a corner impact on an end of the tubular beam.

An advantage of the inventive concepts disclosed herein is that they help the bumper pass Federal Motor Vehicle Safety Standards (FMVSS) 581, as well as pass Insurance Institute for Highway Safety (EIIS) standards, as well as provide increased corner impact strengths. It is contemplated that these concepts can be used in many different bumpers to help pass FMVSS and other test standards.

These and other advantages of the present invention will be further understood and appreciated by persons skilled in the art by reference to the following specification, claims, and appended drawings.

DESCRIPTION OF THE DRAWINGS

FIG. 3 is a plan view of the bumper;

FIG. 4 is a front, elevational view of the bumper;

FIG. 5 is an enlarged cross-sectional view of the bumper along the plane V—V of FIG. 4; and FIG. 6 is a plan view of an end of the bumper after corner impact.

DESCRIPTION OF THE PREFERRED EMBODIMENTS

Figure 1:
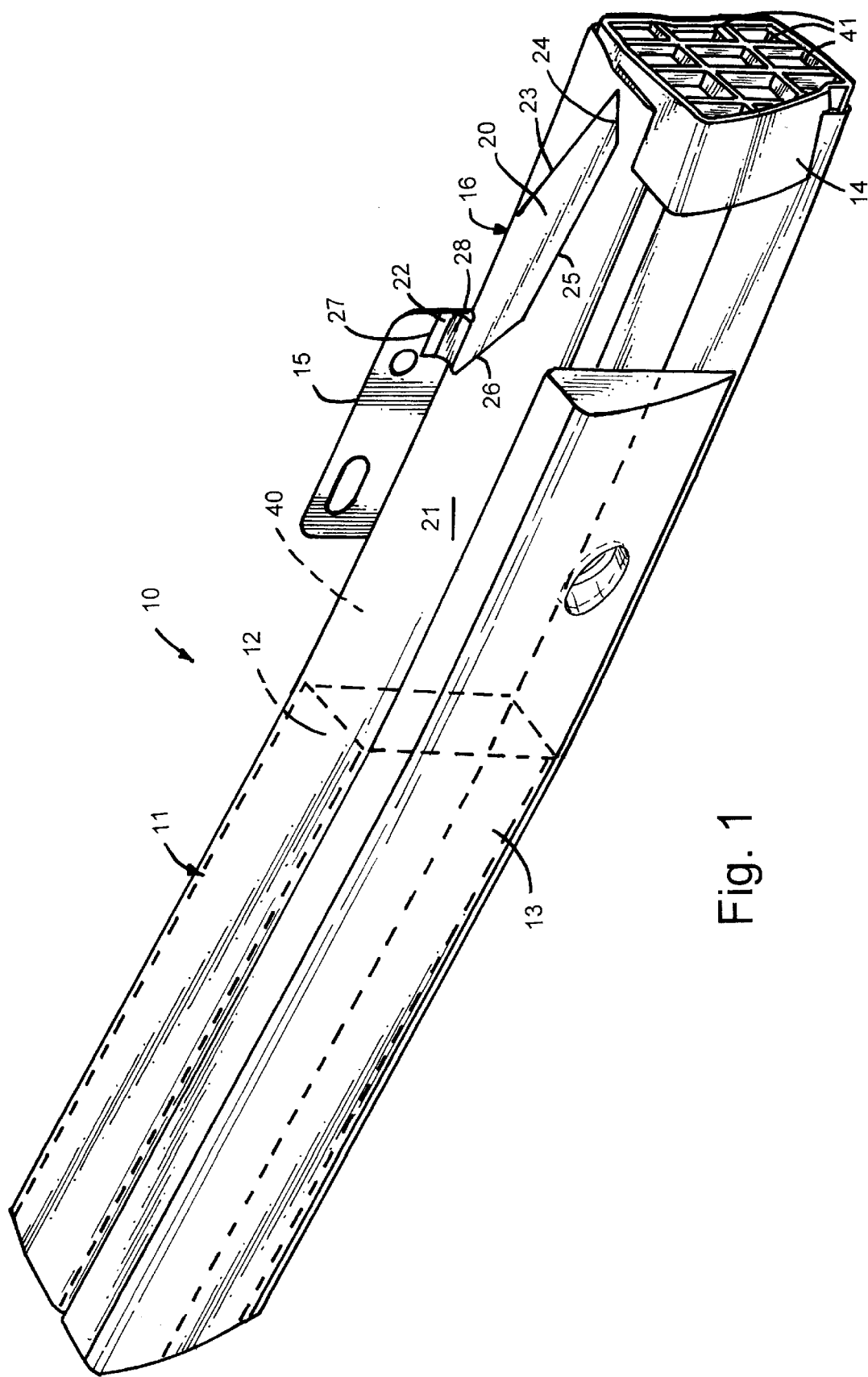
FIG. 1 is a perspective end view of a preferred embodiment of the tubular bumper.

The present bumper construction 10 (FIG. 1) includes a roll formed tubular bumper beam 11, an internal foam energy absorber 12, an external foam energy absorber 13 located on a front face of the bumper beam 11, honeycomb-shaped energy absorbing end pieces 14, mounting brackets 15 attached to a rear wall of the bumper beam 11, and top and bottom stiffening brackets attached to each mounting bracket 15 and to top and bottom walls of each bumper beam 11, as described below. The arrangement provides a flexible bumper that is advantageously high in strength and high in energy absorption, including both frontal and corner impacts.

Bumper beam 11 (FIG. 5) has a top wall 30, a front wall 32, a rear wall 34, and a bottom wall 36. The illustrated bumper beam 11 is roll formed from an ultrahigh strength steel, minimal tensile strength of 190 KSI, and a material thickness greater than 1.0 mm. The beam 11 comprises a single-tube tubular shape swept to a sweep value of preferably about 26½. (Sweep values are known in the industry, but see U.S. Pat. No. 5,092,512, issued Mar. 3, 1992, to Sturrms et al., entitled "Method of Roll-Forming an Automotive Bumper," for a more detailed explanation. The entire contents of U.S. Pat. No. 5,092,512 are incorporated herein by reference, in its entirety). Notably, as taught in U.S. Pat. No. 5,092,512 and in related patents, material properties, thickness, and shape in bumper beams can be varied to achieve different impact strength and styles, as is known in the art.

Plate-shaped mounting brackets 15 (FIG. 3) are welded to the rear wall 34 of bumper beam 11 at locations spaced inboard from the end of bumper beam 11. Mounting brackets 15 include apertures 15' (FIG. 4) configured to facilitate attachment of bumper construction 10 to a frame-supported mount on a vehicle.

Top and bottom stiffening brackets 16 are attached to each end of bumper beam 11 on its top and bottom walls 30 and 36, respectively. The stiffening brackets 16 are each attached to an outboard side of the associated mounting bracket 15. It is contemplated that a simplified design that combines stiffening bracket 16 and mounting bracket 15 could be used at each end, although this is not preferred in the illustrated design. The stiffening brackets 16 rigidify the ends of bumper beam 11 sufficiently to allow bumper beam 11 to pass corner pendulum impact tests required by FMVSS 581. Stiffening brackets 16 solve the problem created when bumper beam 11 is made to deflect enough to meet the direct front impact "pole" tests (i.e., which can result in a bumper stroke of upwards of three inches). However, in such bumper beam 11, the end sections become "too flexible" at critical locations. This problem could be solved by increasing material thickness or stiffness properties; however, such a change reduces the flexibility, which is undesirable. The stiffening brackets 16 solve this problem by supporting ends of the beam 11, while still allowing the ends to flex. Notably, the IIHS 7-inch diameter pole test on a center of the bumper has no effect on the ends of the bumper. Nonetheless, the stiffening brackets 16 help to stiffen the ends of the bumper when the ends extend a significant distance outboard from the rail supports.

Figure 2:
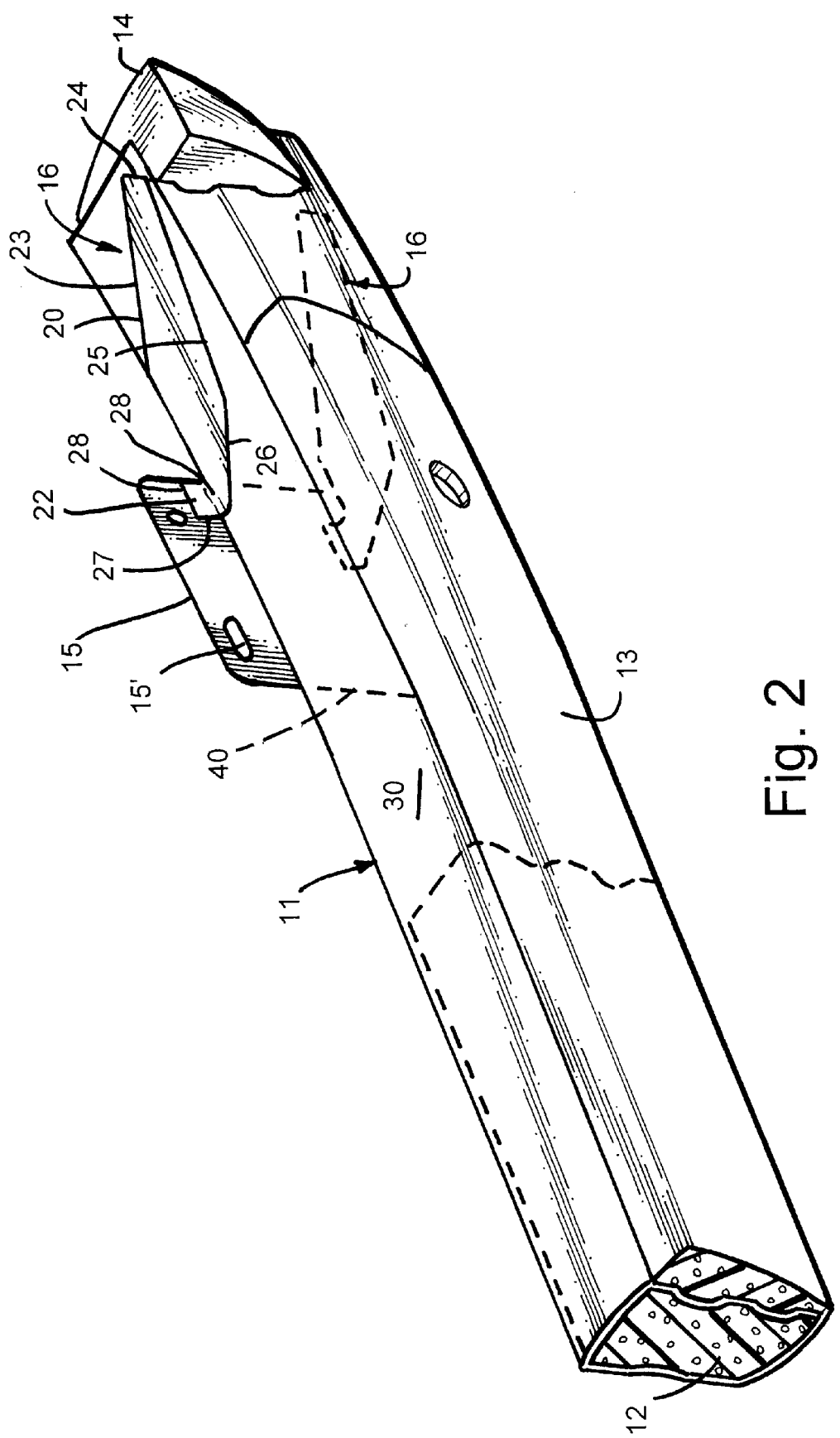
FIG. 2 is a fragmentary perspective view showing an end of the tubular bumper of FIG. 1.

The stiffening bracket 16 (FIG. 2) is L-shaped and includes an arm 20 that lies flat on the top wall 30 (or bottom wall) of bumper beam 11 and is MIG welded in strategic locations, such as locations 23–27, along its edges. The arm 20 of the stiffening bracket 16 has an uneven quadrilateral shape enabling it to extend from mounting bracket 15 forwardly and outwardly toward a center and end of the top wall 30 of bumper beam 11. The stiffening bracket 16 further includes an attachment flange 22 that is welded or otherwise extends from the mounting brackets 15. Intermediate section 28 connects the arm 20 and the attachment flange 22. Section 28 allows for orientation of 16 material for welding of 28 or transition of 28 to 15, and can permit some flexing to occur between arm 20 and the flange 22, thus providing flexibility to the reinforced end arrangement. The attachment flange 22 lies substantially flat against the mounting bracket 15. As noted above, stiffening brackets 16 are welded in several locations 23–27, but it is contemplated that they can be welded continuously between one or more of locations 23–26. The welds 23–28 are located to optimally distribute stress during vehicle crash or impact, and are optimally located to maintain the planar flat shape of stiffening brackets 16 and of the top and bottom walls of bumper beam 11. The strength and additional energy absorbing feature added by stiffening brackets 16 to bumper beam 11 is surprising and unexpected, and it is contemplated that this arrangement will provide significantly improved corner impact strength without degrading the frontal impact strength of the bumper beam 11, and without requiring a material change or redesign of the bumper beam 11.

Bumper construction 10 employs an energy absorbing system including an internal energy absorber 12 and an external energy absorber 13. Both the internal energy absorber 12 and the external absorber 13 (FIG. 2) are premolded from expanded polypropylene pellets (EPP) or the like. External absorber 13 is located on the front face of the center section of bumper beam 11. Internal energy absorber 12 is located within the center section of the tubular beam 11 and completely fills the cross section in a center section of the bumper beam 11, such that it prevents premature collapse of the bumper beam 11, such as during center pendulum, flat barrier, and impact with a pole. Significantly, there are gaps between the outer ends of internal energy absorber 12 and the inner ends of energy absorbing end pieces 14. There are also gaps between the outer ends of external absorber 13 and the inner ends of end pieces 14. This arrangement provides optimal distribution of stress during corner impact tests because it provides a zone 40 of empty space that allows the bumper beam 11 to flex upon flat barrier and corner impact allowing the section to crash, thus helping rail loading. As with frontal pole impacts, some flexing is desired in corner impacts.

The honeycomb pattern is used to reduce strength and stiffness in the bumper where needed. The end pieces 14 include a groove that mateably engages the open ends of bumper beam 11, such that the end pieces 14 stabilize and maintain the general shape of bumper beam 11 during a corner impact along direction 42 (see FIG. 6), thus preventing premature collapse of an end of the bumper beam 11.

By way of illustration, the present bumper construction 10 can be made with a total weight of about 11.9 to 12.6 pounds. (This compares to a total weight of about 15 to 16 pounds for a bumper having sufficient strength to pass the same vehicle impact tests for a similar vehicle and that is made not using the present invention.) Specifically, the tubular beam 11 of the present invention weighs about 8.8 to 9.5 pounds, while the two brackets 15 weigh about 0.4 pounds each, the four reinforcements 16 weigh about 0.1 pounds each, the internal foam 12 weighs about 0.6 pounds, the front foam 13 weighs about 0.7 pounds, the two end plugs 14 weigh about 0.3 pounds each, and the screws and fastener weights are relatively insignificant. The tubular beam 11 is made of high-strength steel to ultrahigh strength steel having a thickness of about 1.2 mm and a tensile strength of about 100 KSI or more. (The bumper weighing 15 to 16 pounds mentioned above that does not use the present technology has a wall thickness of about 1.5 mm to 1.8 mm, which results in a much heavier tubular beam weight.)

While the above description focuses on the preferred embodiments, modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The invention claimed is:

1. A bumper construction for vehicles comprising:

an elongated tubular beam having front, rear, top, and bottom walls, and having a center section and end sections, the beam being high strength to absorb substantial energy on impact;

a mounting bracket attached at each end of the center section inboard of the end section, the mounting brackets extending from the rear wall and being configured for attachment to a vehicle frame; and at least one stiffening bracket attached to each of the mounting brackets, the at least one stiffening bracket including an arm that extends outboard from the mounting bracket at least about half a length of the end sections and that is attached to an associated one of the end sections, the arms lying closely adjacent one of the top and bottom walls and being securely attached to the one of the top and bottom walls to rigidify the associated one end section for corner impact.

2. The bumper construction defined in claim 1, wherein the top and bottom walls are relatively planar and generally horizontal when in a car-mounted position, and wherein the arm of the at least one stiffening bracket is attached to one of the top and bottom walls.

3. The bumper construction defined in claim 2, wherein the at least one stiffening bracket includes a plurality of stiffening brackets where each have an arm welded to one of the top and bottom walls.

4. The bumper construction defined in claim 3, wherein the at least one stiffening bracket includes a second stiffening bracket attached to the associated one end section, and wherein the first-mentioned stiffening bracket is attached to the top wall and to the mounting bracket, and the second stiffening bracket is attached to the bottom wall and to the mounting bracket.

5. The bumper construction defined in claim 4, wherein the first-mentioned and second stiffening brackets each include an attachment flange attached to the mounting bracket and further include an intermediate section connecting the attachment flange to the arm.

6. The bumper construction defined in claim 5, wherein the arm extends to a location between the front and rear walls proximate an end of the end section to which the respective arm is attached.

7. The bumper construction defined in claim 6, wherein each of the arms is MIG welded at discontinuous locations along edges of the arms.

8. The bumper construction defined in claim 1, wherein the at least one stiffening bracket includes a plurality of stiffening brackets where each include an attachment flange attached to the associated mounting bracket, an arm attached to one of the top and bottom walls, and further include an intermediate section connecting the attachment flange to the arm.

9. A bumper construction for vehicles comprising:
   an elongated tubular beam having front, rear, top, and bottom walls that define a cavity, and having a center section and end sections, the beam being high strength to absorb substantial energy on impact;
   mounting brackets attached at ends of the center section, the mounting brackets extending from the rear wall and being configured for attachment to a vehicle frame; and
   an energy absorbing system attached to the flexible tubular beam, including a center absorber filling a significant portion of the cavity in the center section to stiffen the center section against buckling collapse, and including end absorbers filling the cavity in a significant portion of the opposing end sections to stiffen the end sections against buckling collapse, an inner surface of the end absorbers being spaced from an associated outer end surface of the center absorber to leave an empty end area in the cavity at the mounting brackets to promote flexibility in an area proximate to the mounting brackets to assist in optimizing energy absorption upon a corner impact on an end of the tubular beam.

10. The bumper construction defined in claim 9, including a front energy absorber attached to a front wall of the flexible tubular beam.

11. The bumper construction defined in claim 10, wherein the end absorber includes a first portion that extends into the cavity of the tubular beam and a second portion that engages an outer surface on one of the front, rear, top, and bottom walls.

12. The bumper construction defined in claim 11, wherein the center absorber comprises a foam insert having a front surface that engages the front wall and a rear surface that engages the rear wall.

13. The bumper construction defined in claim 11, wherein the front wall includes a non-planar shape, and the front absorber includes a rear surface configured to mateably engage the non-planar shape of the front wall.

14. The bumper construction defined in claim 11, including top and bottom stiffening brackets at each end of the tubular beam, the top and bottom stiffening brackets each including an arm welded to an associated one of the top wall and bottom wall, and further including a flange attached to an associated one of the mounting brackets.

15. The bumper construction defined in claim 9, wherein the end absorbers comprise an injection molded piece having walls and recesses therebetween forming a honeycomb-like arrangement optimally suited for strength upon a corner impact directed primarily against one of the end absorbers.

16. The bumper construction defined in claim 15, wherein the center absorber comprises a foam insert having a front surface that engages the front wall and a rear surface that engages the rear wall.

17. A bumper construction for vehicles comprising:
   an elongated tubular beam having front, rear, top, and bottom walls, and having a center section and end sections, the beam being high strength to absorb substantial energy on impact, the tubular beam being elongated and defining a longitudinal direction;
   a mounting bracket attached at each end of the center section, the mounting brackets extending from the rear wall and being configured for attachment to a vehicle frame; and
   at least one stiffening bracket attached to each of the mounting brackets, the at least one stiffening bracket including an arm that is elongated in the longitudinal direction and that extends outboard from the mounting bracket, the arm lying closely adjacent one of the top and bottom walls and being attached to the one of the top and bottom walls and further being constructed to rigidify the end sections for corner impact.

18. A bumper construction for vehicles comprising:
   an elongated tubular beam having front, rear, top, and bottom walls, and having a center section and end sections, the beam being high strength;
   mounting brackets attached at each end of the center section, the mounting brackets extending from the rear wall and being configured for attachment to a vehicle frame; and
   top and bottom stiffening brackets attached to each of the mounting brackets and to the end sections outboard of the center section, the top stiffening brackets being attached to the top wall and being constructed to rigidify the end sections for corner impact, the bottom stiffening brackets being attached to the bottom wall and being constructed to also rigidify the end sections for corner impact;
   wherein the top and bottom walls are relatively planar and generally horizontal when in a car-mounted position;
   wherein the at least one stiffening bracket includes a plurality of stiffening brackets where each have an arm welded to one of the top and bottom walls;
   wherein the top and bottom stiffening brackets each include an arm, an attachment flange attached to the mounting bracket, and an intermediate section connecting the attachment flange to the arm; the arm extending to a location between the front and rear walls proximate an end of the end section to which the respective arm is attached; each arm being MIG welded at discontinuous locations along edges of the arms; and
   an energy absorber system attached to the tubular beam, the energy absorber system including a center absorber positioned inside the tubular beam generally in center thereof, an end absorber positioned at least in part inside the tubular beam at an end thereof, and a front absorber attached to a front wall of the tubular beam.

19. A bumper construction for vehicles comprising:

an elongated tubular beam having front, rear, top, and bottom walls, and having a center section and end sections, the beam being high strength to absorb substantial energy on impact;

a mounting bracket attached at each end of the center section inboard of the associated end section, the mounting brackets extending from the rear wall and being configured for attachment to a vehicle frame; and at least one stiffening bracket attached to each of the mounting brackets, the at least one stiffening bracket including an elongated arm that extends outwardly along the tubular beam and that is attached to the associated end section outboard of the center section, the stiffening brackets being attached to one of the top and bottom walls and being constructed to rigidify the end sections for corner impact; and an energy absorber system attached to the tubular beam, the energy absorber system including a center absorber positioned inside the tubular beam generally in center thereof, an end absorber positioned at least in part inside the tubular beam at an end thereof, and a front absorber attached to a front wall of the tubular beam.

* * * * *

UNITED STATES PATENT AND TRADEMARK OFFICE
CERTIFICATE OF CORRECTION

PATENT NO. : 6,179,353 B1  
DATED : January 30, 2001  
INVENTOR(S) : David W. Heatherington et al.

Page 1 of 1

It is certified that error appears in the above-identified patent and that said Letters Patent is hereby corrected as shown below:

Abstract,
Lines 13 & 14, "comer" should be -- corner --;

Column 1,
Line 50, "comer" should be -- corner --;

Column 2,
Line 8, "(EIIS)" should be -- (IIHS) --;
Line 9, "comer" should be -- corner --;
Line 27, "comer" should be -- corner --;
Line 52, "Sturrms et al." should be -- Sturrus et al. --;

Column 3,
Line 50, "comer" should be -- corner --.

Signed and Sealed this

Thirtieth Day of October, 2001

Attest:

NICHOLAS P. GODICI  
Attesting Officer — Acting Director of the United States Patent and Trademark Office